(12) United States Patent
Furuya et al.

(10) Patent No.: US 8,269,139 B2
(45) Date of Patent: Sep. 18, 2012

(54) FIBER CUTTING MECHANISM AND LASER LIGHT SOURCE APPLICATION APPARATUS COMPRISING THE MECHANISM

(75) Inventors: Hiroyuki Furuya, Nara (JP); Kazuhisa Yamamoto, Osaka (JP); Shinichi Kadowaki, Hyogo (JP)

(73) Assignee: Panasonic Corporation, Osaka (JP)

( * ) Notice: Subject to any disclaimer, the term of this patent is extended or adjusted under 35 U.S.C. 154(b) by 896 days.

(21) Appl. No.: 12/376,653

(22) PCT Filed: Mar. 6, 2008

(86) PCT No.: PCT/JP2008/000459
§ 371 (c)(1),
(2), (4) Date: Feb. 6, 2009

(87) PCT Pub. No.: WO2008/111292
PCT Pub. Date: Sep. 18, 2008

(65) Prior Publication Data
US 2010/0183037 A1    Jul. 22, 2010

(30) Foreign Application Priority Data
Mar. 12, 2007  (JP) .................................. 2007-061475

(51) Int. Cl.
*B23K 26/00* (2006.01)
(52) U.S. Cl. .......... 219/121.72; 219/121.83; 219/121.62
(58) Field of Classification Search ............. 219/121.72, 219/121.67, 121.78, 121.86, 121.83, 121.85; 372/6; 385/134
See application file for complete search history.

(56) References Cited

U.S. PATENT DOCUMENTS

| | | | | |
|---|---|---|---|---|
| 5,050,173 A | * | 9/1991 | Hughes | 372/6 |
| 6,263,002 B1 | * | 7/2001 | Hsu et al. | 372/6 |
| 7,889,422 B2 | * | 2/2011 | Furuya et al. | 359/326 |
| 2002/0168139 A1 | * | 11/2002 | Clarkson et al. | 385/27 |
| 2005/0007562 A1 | | 1/2005 | Seki et al. | |
| 2006/0244925 A1 | | 11/2006 | Seki et al. | |

FOREIGN PATENT DOCUMENTS

| | | |
|---|---|---|
| JP | 2001-267670 | 9/2001 |
| JP | 2004-341210 | 12/2004 |
| JP | 3680842 | 5/2005 |
| JP | 2007-129133 | 5/2007 |
| WO | WO 2006129809 A1 * | 12/2006 |

OTHER PUBLICATIONS

International Search Report mailed Apr. 1, 2008 for International Application No. PCT/JP2008/000459.

* cited by examiner

*Primary Examiner* — M. Alexandra Elve
(74) *Attorney, Agent, or Firm* — Wenderoth, Lind & Ponack, L.L.P.

(57) ABSTRACT

A fiber cutting mechanism prevents secondary utilization of a fiber laser light source that is incorporated in a device that uses a laser light. With a characteristic fiber cutting mechanism, when a laser device is separated from a laser light source application apparatus, at least a fiber is cut in an specific area from a point within a fiber grating to a connection point between the fiber grating and the fiber containing a laser activating substance.

20 Claims, 17 Drawing Sheets

CUTTING POSITION AREA(2)

CUTTING POSITION AREA(1)

CUTTING POSITION AREA(3)

FIBER BEING CUT

FIBER BEING CUT (a)

FIBER THAT HAS BEEN CUT

(b)

FIBER CUTTING MECHANISM AND LASER LIGHT SOURCE APPLICATION APPARATUS COMPRISING THE MECHANISM

TECHNICAL FIELD

The present invention relates to a fiber cutting mechanism incorporated in a laser device which obtains a stable high-power visible laser by combining a fiber laser and a wavelength conversion element, and to a laser light source application apparatus comprising the fiber cutting mechanism.

BACKGROUND ART

A visible light source capable of a watt-class high output with strong monochromaticity is considered to be necessary in order for the realization of a large display, a high brightness display or the like. Among the three primary colors, red, green and blue, as a light source for red, a red high output semiconductor laser is applicable, which is a compact light source with high productivity used in a DVD recorder or the like. However, realization of a light source for green or blue by a semiconductor laser or the like is difficult, and a compact light source with high productivity is sought after. Particularly, the difficulty level in the realization of a light source for green is high, since there is no appropriate material for forming a semiconductor laser for obtaining a green output light.

As such a light source, a wavelength converter is realized as a low output visible light source that combines a fiber laser and a wavelength conversion element. Well known is a small light source for green or blue which uses a semiconductor laser as a light source for an excitation light that pumps a fiber laser and which uses a nonlinear optical crystal as a wavelength conversion element.

Furthermore, in a case of obtaining an output light of green or blue with a watt-class high output from such a wavelength converter, the wavelength converter comprises: a fiber laser that outputs a fundamental wave, a wavelength conversion element that converts the fundamental wave into a green laser light, and a lens that condenses the output of the fundamental wave on an end face of the wavelength conversion element.

The laser light source that realizes the green output light as described is precious and has a high value. Therefore, there is a problem that the laser light source incorporated in a laser light source application apparatus is removed for secondary utilization in other usages unforeseen by the designer.

To deal with this problem, a solid-state laser source is proposed, which has a mechanism that inserts a detrimental object (shutter) within a resonator at the same time as a laser light source is removed, resulting in blocking laser oscillation (ref. Patent Document 1). Furthermore, a projector that renders a laser diode dysfunctional is proposed, in which the projector generates a voltage surge when an attempt to remove a laser light source is made (ref. Patent Document 2).

[Patent Document 1] Japanese Laid-Open Patent Publication No. 2001-267670

[Patent Document 2] Japanese Laid-Open Patent Publication No. 2004-341210

SUMMARY OF THE INVENTION

Problems to be Solved by the Invention

Methods described in Patent Documents 1 and 2 may render the laser diode for excitation unusable; however, even if these methods are used, it is still possible to remove and reuse a fiber laser resonator. From this fiber laser resonator, a single mode laser light with a high output and a favorable beam pattern may be obtained.

In order to prevent laser oscillation, it is necessary to insert an object detrimental to the fiber laser resonator or dissatisfy the resonance condition of the resonator. However, in a case with a fiber laser, unlike the above case with a solid-state laser, a destruction of any portion of a mirror or a solid-state laser crystal, both of which are components of a resonator, does not necessarily prevent laser oscillation, depending on the portion destroyed. Furthermore, since a fiber laser light source is made of one fiber, a detrimental object cannot be inserted in the resonator. Still further, the fiber laser has a problematic feature in that even if a fiber grating that is a component of the resonator and which plays a role as a reflecting mirror is cut out, a cut end face of the fiber acts as a reflecting mirror and laser oscillation occurs. Therefore, a problem is that the above-described conventional methods cannot be applied to a fiber laser without any changes being made.

Hence, the objective of the present invention is to provide: a fiber cutting mechanism that prevents secondary utilization of a fiber laser light source incorporated in a device that uses a laser light, and a laser light source application apparatus comprising the fiber cutting mechanism.

Solution to the Problems

The present invention is directed toward a fiber cutting mechanism provided on a laser device mounted on a laser light source application apparatus. The fiber cutting mechanism of the present invention is applied to a laser device that comprises an excitation laser light source that inputs a laser light into a fiber, a fiber laser light source that includes a fiber containing a laser activating substance and a fiber laser resonator containing a fiber with a fiber grating formed therein, and a wavelength conversion element that coverts a laser light with a fundamental wave emitted from the fiber laser light source into a harmonic laser light. In order to achieve the objective, the fiber cutting mechanism comprises a fiber cutting section that performs fiber cutting in a specified area from a point within the fiber grating to a connection point between the fiber grating and the fiber containing the laser activating substance, when the laser device is separated from the laser light source application apparatus.

Preferably, the fiber cutting section includes: a box in which a chemical agent, which generates a substantial amount of gas when heated, is enclosed, a heater that heats the chemical agent, a detection section that detects a separation of the laser device from the laser light source application apparatus, a power supply that applies current to the heater in response to the separation detected by the detection section. The box bursts due to heating of the chemical agent, thereby performing the fiber cutting in the specified area. In this case, it is desired that the detection section detects at least one of either a mechanically separated state or an electrically separated state of the laser device and the laser light source application apparatus.

Alternatively, the fiber cutting section includes: a slit provided in the specified area of the fiber, and a guide blade that performs the fiber cutting in cooperation with a fixture provided on the laser light source application apparatus. The laser device is mounted on the laser light source application apparatus by means of the fixture. The fiber cutting is performed in the specified area by passing of the fixture through the slit when the laser device is mechanically separated from the laser light source application apparatus.

Further alternatively, the fiber cutting section includes: a guide blade provided in the specified area of the fiber, which rotates to perform the fiber cutting; and a screw receiving section that rotates the guide blade in one direction by a ratchet function, in cooperation with a screw attached from a laser light source application apparatus side. The laser device is mounted on the laser light source application apparatus by means of the screw; and the fiber cutting is performed in the specified area with a rotation of the guide blade by the screw receiving section when the screw is unscrewed and the laser device is mechanically separated from the laser light source application apparatus.

Preferably, the specified area is formed of a double-clad fiber. Also preferably, the fiber containing the laser activating substance is a Yb-doped double clad fiber and a wavelength of the fundamental wave is from 1000 nm to 1200 nm. Even more preferably, an outer diameter of the fiber is from 240 µm to 260 µm. Furthermore, it is desired that the connection point between the fiber grating and the fiber containing the laser activating substance is on a fiber where a seed light, which is the fundamental wave, resonates.

The fiber cutting section is applicable to: a laser light source application apparatus comprising a laser light source that outputs a laser light, an optical engine that produces, in response to an input video signal, an optical signal from the laser light outputted from the laser light source, and a screen that projects the optical signal produced by the optical engine; a laser light source application apparatus comprising a laser light source that outputs a laser light, a backlight formed with the laser light outputted by the laser light source, and a liquid crystal panel illuminated by the backlight; or a laser light source application apparatus comprising a laser light source that outputs a laser light, a fiber coupling optical system that produces, in response to a control signal, an optical signal from the laser light outputted from the laser light source, and a delivery fiber that outputs the optical signal produced by the fiber coupling optical system.

Effect of the Invention

According to the present invention, secondary utilization of a fiber laser light source incorporated in a device that uses a laser light can be prevented. Additionally, secondary utilization of a fiber laser resonator alone can be prevented.

Figure 1:
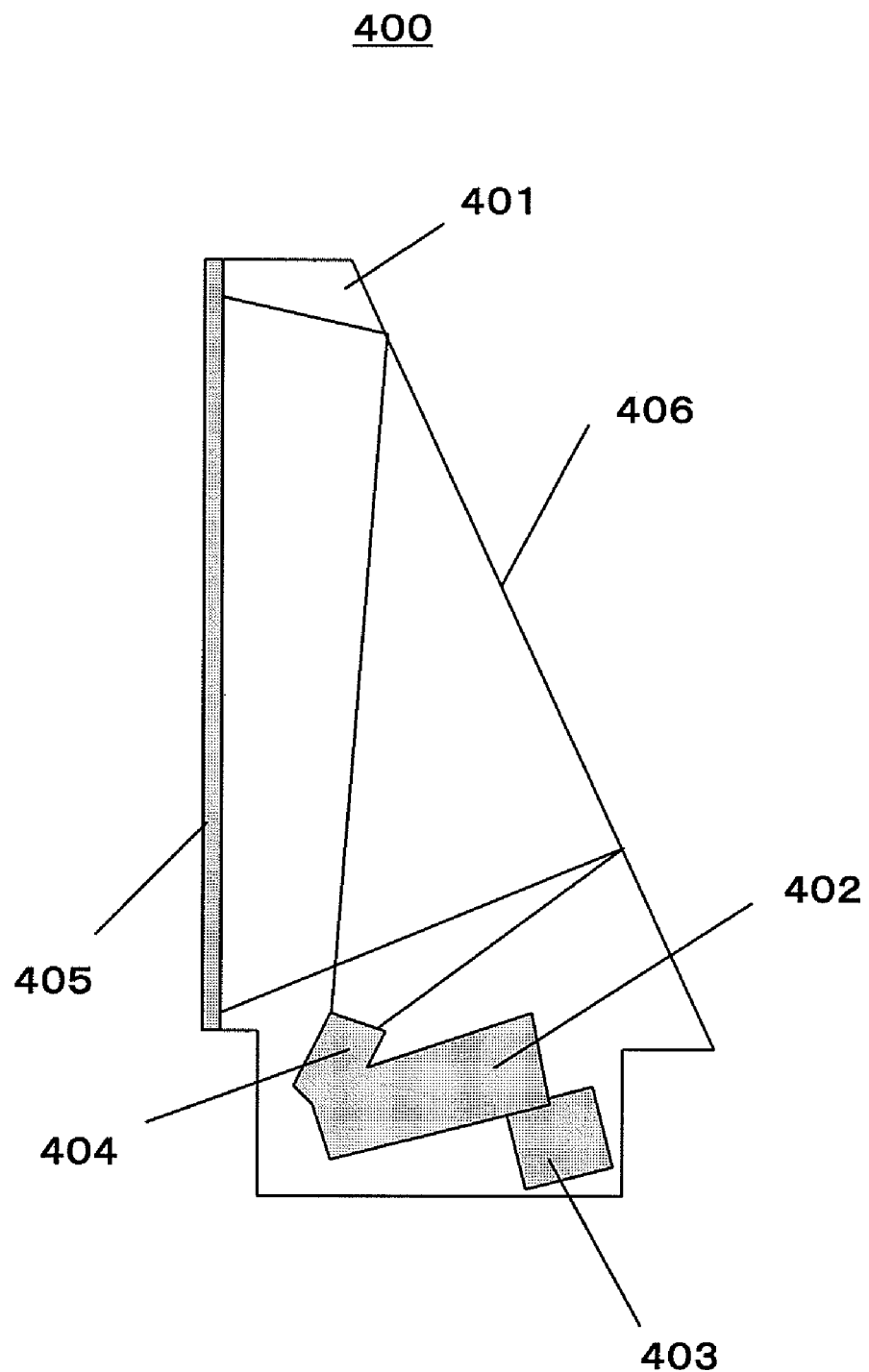
FIG. 1 is a diagram showing a system environment example in which the present invention is applied.

DESCRIPTION OF THE REFERENCE CHARACTERS 21, 301 wavelength converter
22, 62 fiber laser
25 wavelength conversion element
26, 31, 601, 701, 802, 1002 fiber
28, 403 (R, G, B) laser light source
29, 29a, 29b fiber grating
30 prism
32a, 32b, 53, 106 (R, G, B), 107 (R, G, B), 404 lens
33, 34 reflection surface
36 polarization direction unifying mechanism
102 image processing section
103 laser output controller
104, 1103, 1109 power supply
108 (G, B), 406 mirror
109 (R, G, B) two dimensional modulation device(liquid crystal panel)
110 (R, G, B) polarizer
400 rear projection display
401 chassis
402 optical engine
405 screen
602, 702 fixture
603, 703, 803 guide blade
604, 704 slit
605, 705, 805, 1010 fiber holder
608 lock pin
801 screw
804 screw receiving section
806 gear
807 leaf spring
1003 case
1004 cover
1005 chemical agent
1006 heater
1011 groove 1102 fiber cutting section
1104 connection determining section
1105 connector
1106 switch
1108 control circuit

DETAILED DESCRIPTION OF THE INVENTION

The present invention is an invention that prevents secondary utilization of a fiber laser light source or a fiber laser resonator, which is incorporated in a device that uses a laser light. In the following, a basic action of a fiber laser light source is first described by using, as one example, a structure of a projector system that uses a laser light source, and then specific embodiments that prevent secondary utilization of a fiber laser light source are described.

<System Environment Example in which the Present Invention is Applied>

FIG. 1 shows a schematic structural example of a common rear projection display 400 in which the present invention is applied. The rear projection display 400 includes: an optical engine 402, a laser light source 403, a projection lens 404, a screen 405, and a rear mirror 406. These components are fixed onto a chassis 401.

Laser lights emitted from the laser light source 403 are modulated two dimensionally by a video signal inputted in the optical engine 402, and outputted from the projection lens 404. A video image outputted from the projection lens 404 is reflected by the rear mirror 406 and projected onto the screen 405.

Figure 2:
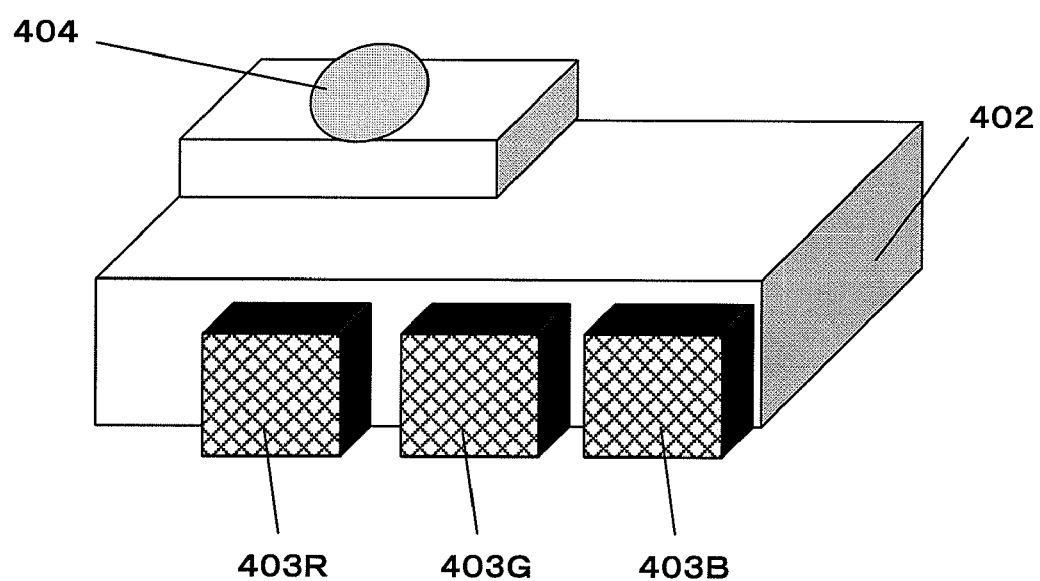
FIG. 2 is a diagram showing a connection state of an optical engine 402 and a laser light source 403.

FIG. 2 is a schematic diagram showing a mechanical connection state of the optical engine 402 and the laser light source 403 of FIG. 1. The laser light source 403 consists of three types of laser light sources; a red laser light source 403R, a green laser light source 403G and a blue laser light source 403B, and the laser light sources 403R, 403G and 403B are each mechanically connected to the optical engine 402.

Figure 3:
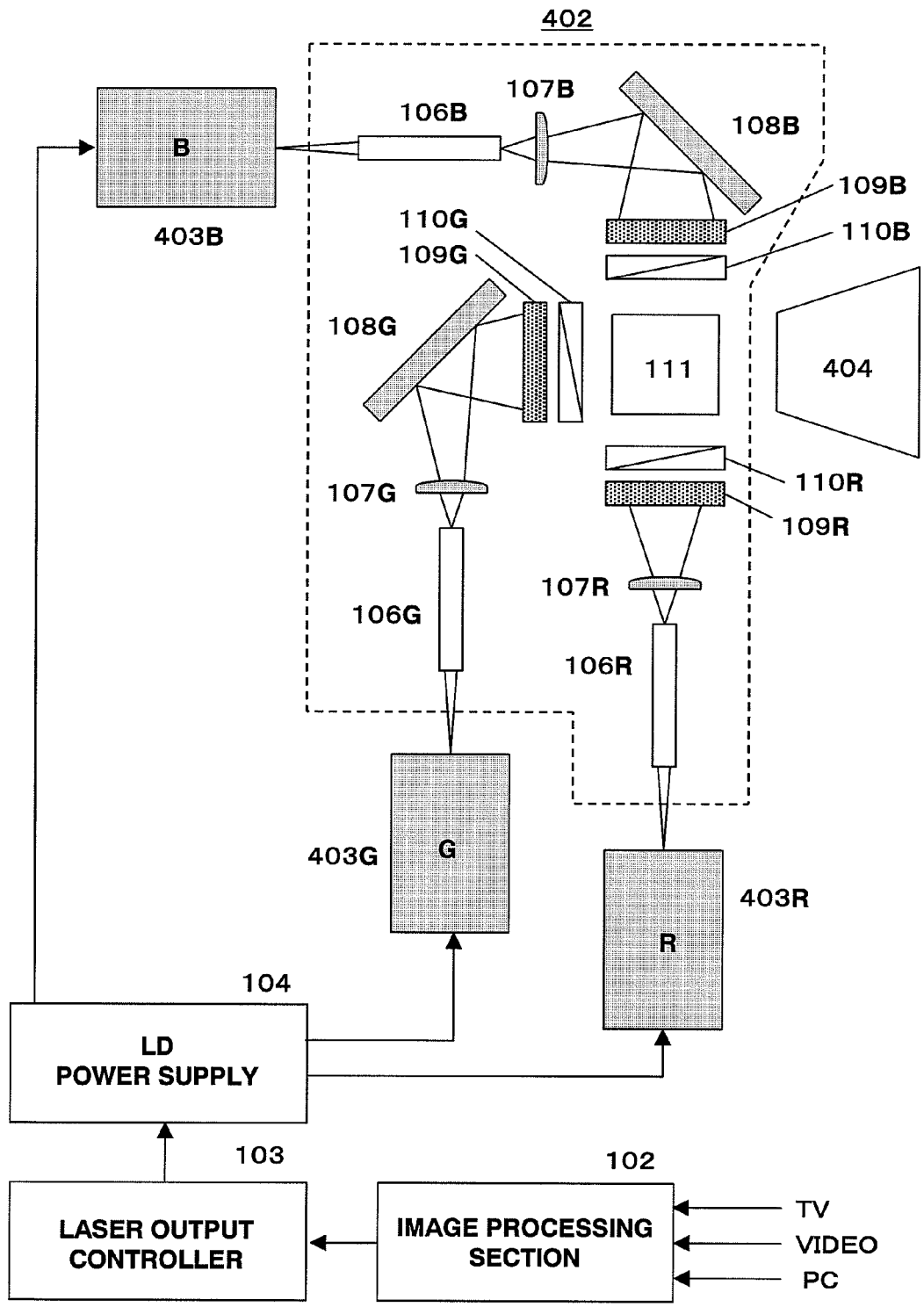
FIG. 3 is a schematic diagram showing a structure of the optical engine 402.

FIG. 3 is a schematic diagram showing the structure of the optical engine 402 in FIG. 2. The optical engine 402 comprises: an image processing section 102; a laser output controller 103; an LD power supply 104; the red laser light source 403R; the green laser light source 403G; the blue laser light source 403B; beam forming rod lenses 106R, 106G and 106B; relay lenses 107R, 107G and 107B; redirecting mirrors 108G and 108B; two dimensional modulation devices 109R, 109G and 109B; polarizers 110R, 110G and 110B; a multiplexing prism 111; and the projection lens 404.

Laser lights emitted from the laser light sources 403R, 403G and 403B are shaped rectangularly by the beam forming rod lenses 106R, 106G and 106B, respectively, and then the laser lights relayed by the relay lenses 107R, 107G and 107B illuminate the two-dimensional modulation devices 109R, 109G and 109B. Images modulated two dimensionally by the two dimensional modulation devices 109R, 109G and 109B are combined by the multiplexing prism 111, and projected on a screen through the projection lens 404. As a result, the video image is displayed on the screen.

Figure 4:
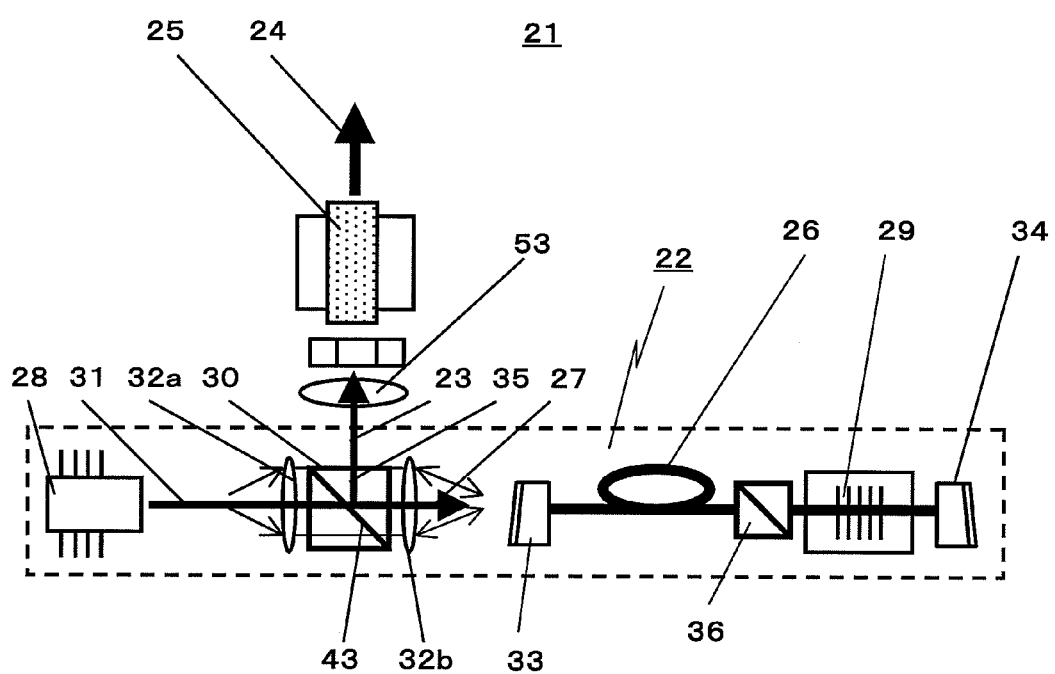
FIG. 4 is a diagram showing a schematic composition of a wavelength converter 21 that is incorporated in a green laser light source 403G.

FIG. 4 is a diagram showing a schematic composition of a wavelength converter 21 that is incorporated in the green laser light source 403G. In FIG. 4, the wavelength converter 21 comprises: a fiber laser 22, and a wavelength conversion element 25 that converts a fundamental wave 23 outputted from the fiber laser 22 into a harmonic output 24. The fiber laser 22 includes: an excitation laser light source 28, a collimator lens 32a, a polarization separation prism 30, a light condensing lens 32b, reflection surfaces 33 and 34, a fiber 26 with a fiber grating 29 formed therein, and a polarization direction unifying mechanism 36. The reflection surfaces 33 and 34, the fiber 26, and the polarization direction unifying mechanism 36 are components of a fiber laser resonator.

Next, a basic action of the fiber laser 22 is described. An excitation light 31 emitted from the excitation laser light source 28 is converted into a parallel light by the collimator lens 32a, and transmitted through the polarization separation prism 30. An excitation light 27 that has been transmitted through the polarization separation prism 30 is condensed by the light condensing lens 32b, and is inputted into the fiber 26, e.g. a double-clad fiber, from the first reflection surface 33. The inputted excitation light 27 propagates through the fiber 26 while being absorbed by a laser activating substance contained in the fiber 26. After passing through the fiber grating 29, the excitation light 27 is reflected by the second reflection surface 34 and is turned back within the fiber 26 and propagates through the fiber 26 while being absorbed by the laser activating substance; and almost completely disappears because of being absorbed by the laser activating substance before making one round trip to reach the first reflection surface 33.

As described above, the excitation light 27 is almost completely absorbed by making one round trip within the fiber 26, and with a state having a uniformly high gain for amplifying a fundamental wave within the fiber 26, a seed light of the fundamental wave 23 is generated inside the fiber 26. The seed light of the fundamental wave 23 reaches laser oscillation, by increasing in intensity due to being amplified during repeatedly making round trips in this resonator using the first reflection surface 33 and the fiber grating 29 as a pair of resonator surfaces, and also by being wavelength selected during the round trips. Here, the fiber grating 29 plays a role as a resonant mirror of the resonator, together with a role as a wavelength selector. Note that, the polarization direction of a light in laser oscillation is in linear polarization because of the polarization direction unifying mechanism 36.

The fundamental wave 23, outputted from the fiber 26, is then outputted from the first reflection surface 33, and after being converted into a parallel light by the light condensing lens 32b, reaches the polarization separation prism 30. The polarization separation prism 30 is constituted such that a light with a wavelength of the excitation light 27 is transmitted therethrough, but a light with a wavelength of the fundamental wave 23 is reflected thereby. Consequently, the fundamental wave 23 is reflected by the polarization separation prism 30 and is led to the wavelength conversion element 25.

The basic action of the wavelength conversion element 25 is described in the following.

The fundamental wave 23 outputted from the polarization separation prism 30 is condensed by a light condensing lens 53 and is inputted into the wavelength conversion element 25. The fundamental wave 23 is converted by a nonlinear optical effect of the wavelength conversion element 25 and becomes the harmonic output 24 with ½ wavelength of the fundamental wave. The wavelength of the fundamental wave is in a range of 1000 nm to 1200 nm.

Figure 5:
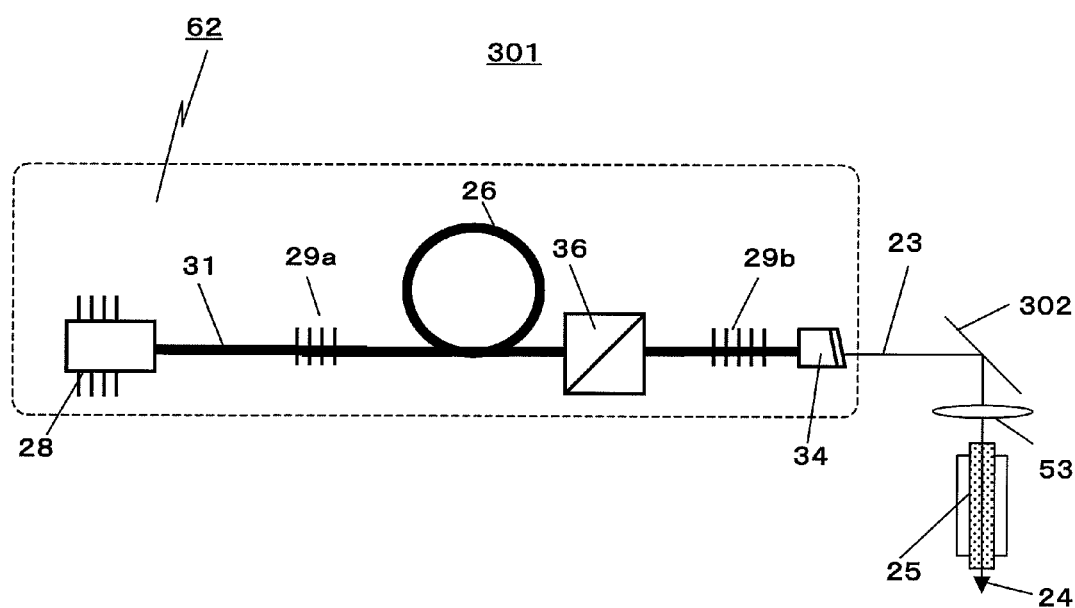
FIG. 5 is a diagram showing a schematic composition of another wavelength converter 301 that is incorporated in the green laser light source 403G.

FIG. 5 is a diagram showing a schematic composition of another wavelength converter 301 that is incorporated in the green laser light source 403G. In FIG. 5, the wavelength converter 301 comprises: a fiber laser 62, and the wavelength conversion element 25 that converts the fundamental wave 23 outputted from the fiber laser 62 into the harmonic output 24. The fiber laser 62 includes: the excitation laser light source 28, the reflection surface 34, a fiber 26 with fiber gratings 29a and 29b formed therein, and the polarization direction unifying mechanism 36.

The wavelength converter 301 has a structure different from the above-described wavelength converter 21 (FIG. 4); in the structure of the wavelength converter 301, the excitation light 31 is outputted directly from the reflection surface 34 without being reflected (without being turned back) at a termination point of the fiber 26. The fundamental wave 23 outputted from the reflection surface 34 is condensed by the light condensing lens 53 and is inputted into the wavelength conversion element 25. The fundamental wave 23 is converted by the nonlinear optical effect of the wavelength conversion element 25 and becomes the harmonic output 24 with ½ wavelength of the fundamental wave. The structure in FIG. 5 has a drawback in which the gain for amplifying the fundamental wave 23 decreases as the excitation light 31 propagates, since the excitation light 31 is merely absorbed while propagating in one direction within the fiber 26.

<Operation Executed by the Present Invention>

The present invention prevents the aforementioned secondary utilization of the green laser light source 403G; and provides a mechanism that renders the green laser light source 403G inoperable when the green laser light source 403G is mechanically or electrically separated from the optical engine 402.

A feature of the present invention is, in the wavelength converter 21 in FIG. 4, to cut the fiber 26 that is a component of the fiber laser resonator in order to render the green laser light source 403G inoperable. Particularly in the present invention, the fiber 26 is cut in an area from a point within the fiber grating 29 formed on the fiber 26 to a connection point between the fiber grating 29 and the fiber 26 containing the laser activating substance (cutting position area (1) of FIG. 6A). The reason for this is described in the following.

In a case with the fiber laser resonator, the fiber grating 29 plays a role not only as a reflecting mirror, but also as a wavelength-selective plate that selects an oscillation wavelength. In the configuration shown in FIG. 4, the seed light of the fundamental wave 23 reaches laser oscillation by increasing in light intensity and also by being wavelength selected, using the first reflection surface 33 and the fiber grating 29 as a pair of resonator surfaces. Therefore, even if laser oscillation is attempted after being cut at a point within the cutting position area (1), the fiber grating 29 within the fiber laser resonator will not function. As a consequence, fixing the oscillation wavelength at a particular wavelength becomes impossible, and a broad ASE light having a bandwidth of several-tens nm range is generated as a giant pulse. Depending on the length of the fiber 26 that contains the laser activating substance, this giant pulse can have a median of 1070 nm. Besides having a broad wavelength, this ASE light has properties not different from a laser light with respect to straightness, condensing property or the like. As a result, the generated giant pulse is inputted in the excitation laser light source 28 as a returned light and destroys the excitation laser light source 28. As just described, by making a cut in the cutting position area (1) and by utilizing a feature of a fiber laser resonator, in which laser oscillation occurs due to a reflection at a cut surface, obtaining a continuous laser oscillation can be made impossible.

Furthermore, even if another excitation laser light source is newly used to obtain laser oscillation, this other excitation laser light source is destroyed in a similar manner. Therefore, unless the fiber connection is redone by using a specialized fiber fusion splicer, secondary utilization of the fiber laser resonator alone can also be prevented.

Furthermore, even when the fiber remaining on the second reflection surface 34 side after destruction is reinstalled in the input position of the excitation light 27, this fiber cannot function as a laser resonator, since this fiber does not have the fiber containing the laser activating substance. Therefore, both the fibers left after the cut are rendered incapable for secondary utilization.

Additionally, restoration can be made impossible even when a fusion splicer is used, by cutting out the fiber grating 29 with the fiber 10 mm before and after the fiber grating 29, resulting in the removal of the fiber grating section used during a fiber fusion splicing operation.

Figure 6A:
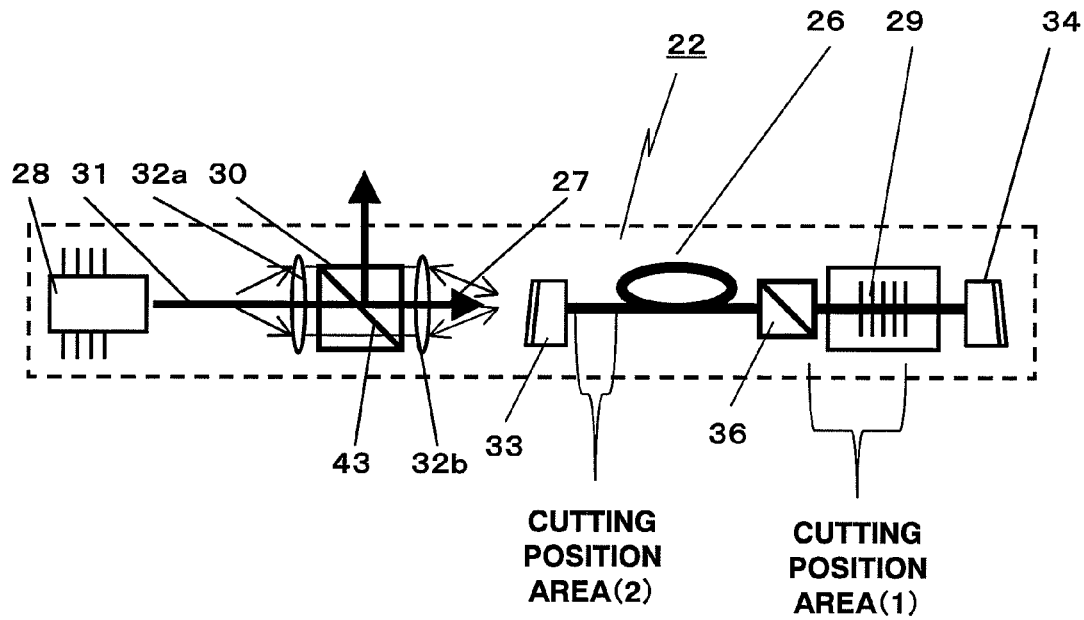
FIG. 6A is a diagram showing a cutting position area of a fiber laser 22 in FIG. 4.

In addition to the cutting position area (1), the fiber may also be cut in an area between the cut position in the cutting position area (1) and the first reflection surface 33 (cutting position area (2) of FIG. 6A). By doing so, the reflection surface at the termination point of the fiber 26 is lost, resulting in the reduction of the reflexibility that prevents the input of the returned light into the excitation laser light source 28. Consequently, not only the ASE light, but also a laser light that results from momentary oscillation is also inputted into the excitation laser light source 28 as a returned light, which results in a sure degradation of the excitation laser light source. Thereby, it is possible to definitely render the fiber laser 22 unusable.

Figure 6B:
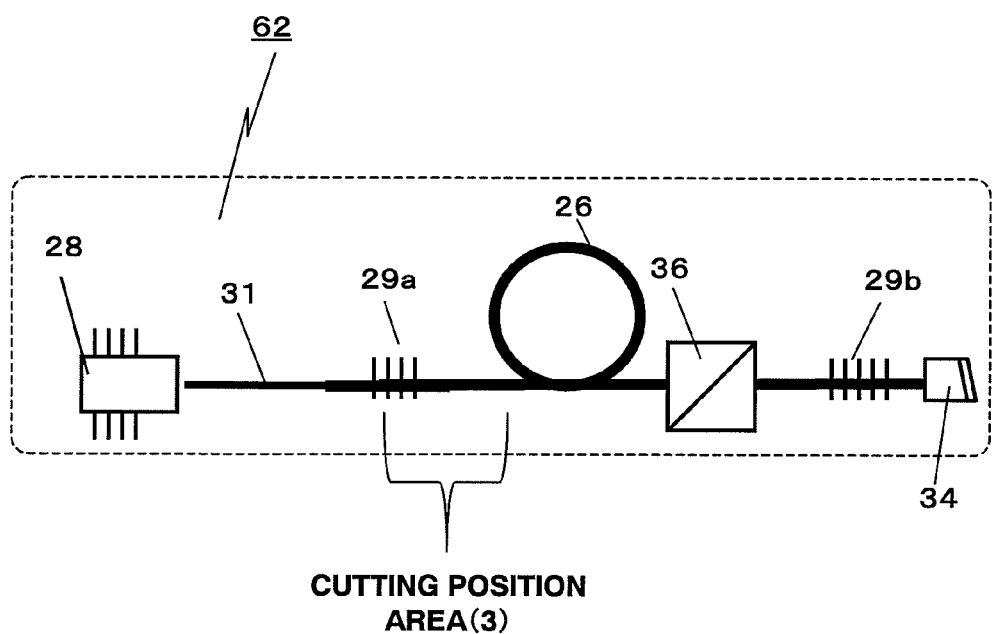
FIG. 6B is a diagram showing a cutting position area of a fiber laser 62 in FIG. 5.

According to the present invention, in the wavelength converter 301 in FIG. 5, in order to render the green laser light source 403G inoperable, the fiber 26 is cut in an area from a point within the fiber grating 29a to a connection point between the fiber grating 29a and the fiber containing the laser activating substance (cutting position area (3) of FIG. 6B). The following is the reason.

When a cut is made in the cutting position area (3), since the connection between the excitation laser light source 28 and the fiber 26 is severed, the laser device is rendered dysfunctional. Furthermore, secondary utilization of the fiber laser resonator after the cut is also not possible. Of the fiber laser resonator after the cut, the fiber grating 29b side of the fiber laser resonator does not have, or only has a part of, the fiber grating 29a that contains a resonator surface on the excitation laser light source 28 side. Therefore, the reflectance of this resonator surface is lower than a normal level, and a laser light that results from momentary oscillation is also inputted into the excitation laser light source 28 as a returned light. Consequently, the excitation laser light source 28 is degraded, and rendered incapable for secondary utilization. Furthermore, of the remaining fiber laser resonator, the excitation laser light source 28 side of the fiber laser resonator cannot function as a laser resonator, since a resonant portion therein does not have the fiber containing the laser activating substance. As just described, by making a cut in the cutting position area (3), secondary utilization of the fiber laser light source and the fiber laser resonator can be prevented.

In the wavelength converter 301 in FIG. 5, in the case when resonance is obtained by using the two fiber gratings 29a and 29b as resonance surfaces, even without cutting both the fiber gratings in the above described area, the predetermined effect can be obtained by only cutting the corresponding area in the fiber grating 29a on the side near the excitation laser light source 28.

<Structural Example to Carry Out the Operation of the Present Invention>

Described specifically in the following is one example of the mechanism that renders the green laser light source 403G inoperable by automatically carrying out the above described cutting operation when the green laser light source 403G is mechanically or electrically separated from the optical engine 402, in reference to FIG. 7A to FIG. 10C(b). An outer diameter of the fiber that is easy to cut is approximately 240 μm to 260 μm.

The First Embodiment

Figure 7A:
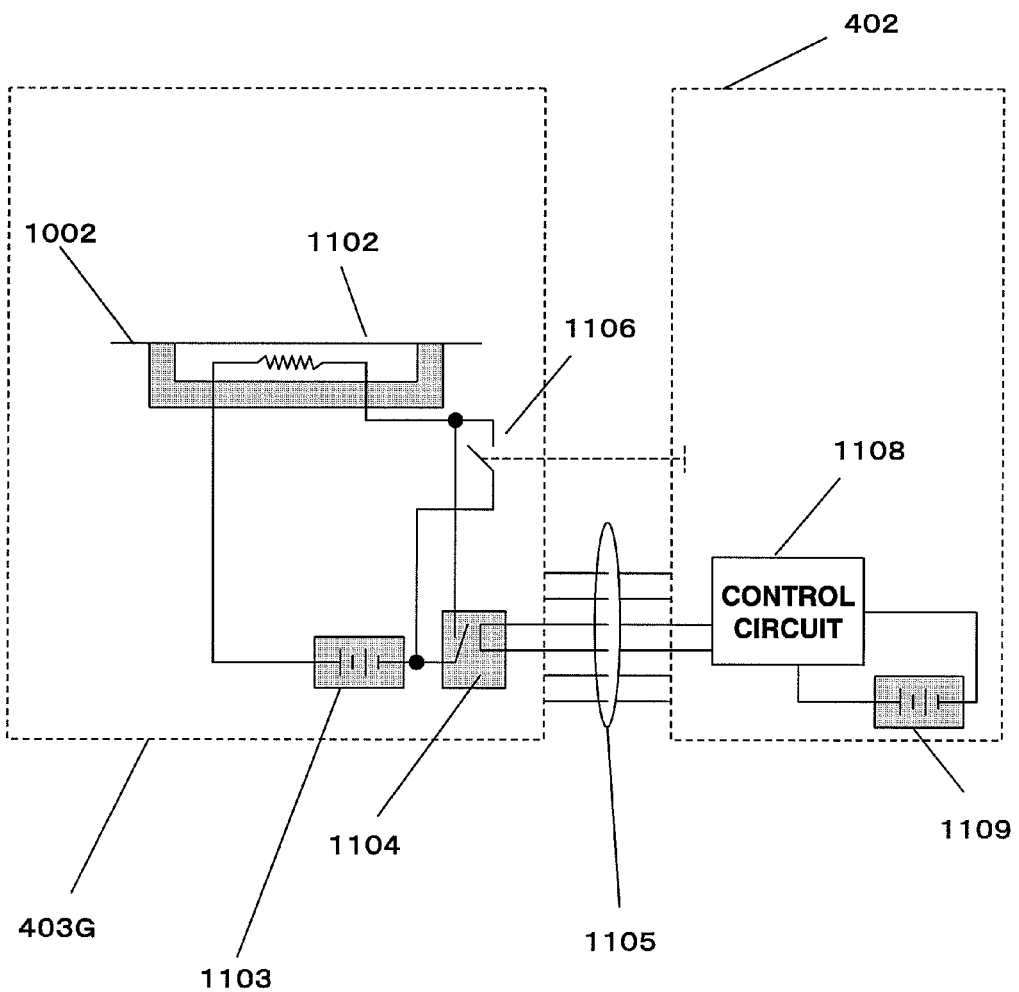
FIG. 7A is a diagram showing a structure of a fiber cutting mechanism according to the first embodiment of the present invention.
Figure 7B:
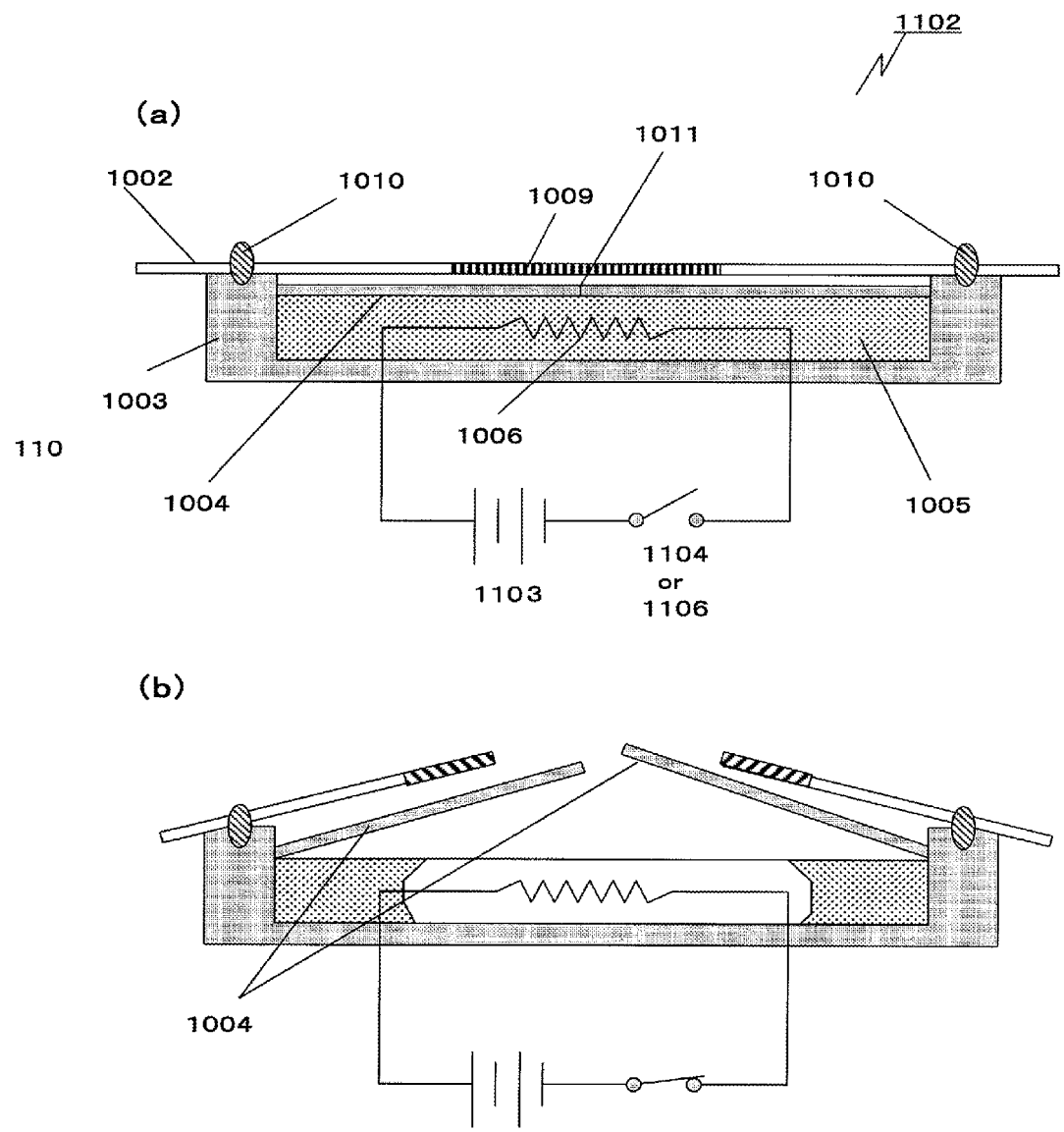
FIGS. 7B(a) and 7B(b) are diagrams showing the structure of the fiber cutting mechanism according to the first embodiment of the present invention.

FIG. 7A and FIGS. 7B(a) and 7B(b) are diagrams showing a structure of a fiber cutting mechanism according to the first embodiment of the present invention. The fiber cutting mechanism according to the first embodiment comprises: a fiber cutting section 1102, a power supply 1103, a connection determining section 1104, a switch 1106, and fiber holders 1010, which are provided on the green laser light source 403G side; and a control circuit 1108 and a power supply 1109, which are provided on the optical engine 402 side. The connection determining section 1104 and the control circuit 1108 are electrically connected via a connector 1105. A lithium battery or the like with long battery life is used as the power supply 1103 and 1109.

The fiber cutting section 1102 has a box structure that is: a case 1003 provided with, a heater 1006, a chemical agent 1005 deposited therein and sealed in with a cover 1004. The cover 1004 is provided with at least one groove 1011. The heater 1006 is connected to the power supply 1103 via the connection determining section 1104 and the switch 1106. The chemical agent 1005 is a substance capable of generating a substantial amount of gas when heated, such as sodium azide or sodium hydrogen carbonate. The connection determining section 1104 and the switch 1106 are connected in parallel, and a detection section is structured with the connection determining section 1104 and the switch 1106. At the green laser light source 403G, a fiber 1002 is fixed onto the fiber holders 1010 such that the above described cutting position area is disposed at the groove 1011 of the fiber cutting section 1102 (FIG. 7B (a)). The control circuit 1108 and the power supply 1109 control a switching operation of the connection determining section 1104 via the connector 1105.

The green laser light source 403G is fixed onto the optical engine 402; electrically via the connector 1105, and mechanically via the switch 1106. When the green laser light source 403G is separated from the optical engine 402, the connector 1105 is removed and a switch for the connection determining section 1104 is set in a connection state, or the switch 1106 is set in a connection state. Therefore, the power supply 1103 supplies power to the heater 1006. This causes heating of the chemical agent 1005 by the heater 1006, which leads to generation of gas, which then leads to bursting of the cover 1004 at the groove 1011. This bursting also cuts the fiber 1002 (FIG. 7B(b)) at a corresponding section 1009. Additionally, a powder generated from the bursting of the cover 1004 sticks to a cross-section of the fiber 1002. Therefore, the fiber laser resonator does not reach a resonance state because the cut surface becomes a resonator loss, rendering it certainly unusable.

It is necessary to set up a fiber replacement procedure so that the fiber cutting mechanism will not work in cases such as a legitimate fiber laser replacement. For example, a fiber laser device for replacement has a tab that prevents the switch 1106 from being turned on, and the fiber replacement procedure comprises: connecting the connector 1105 to start power supply to the connection determining section 1104; then removing the tab; and then attaching the fiber laser device to the optical engine 402.

The Second Embodiment

Figure 8A:
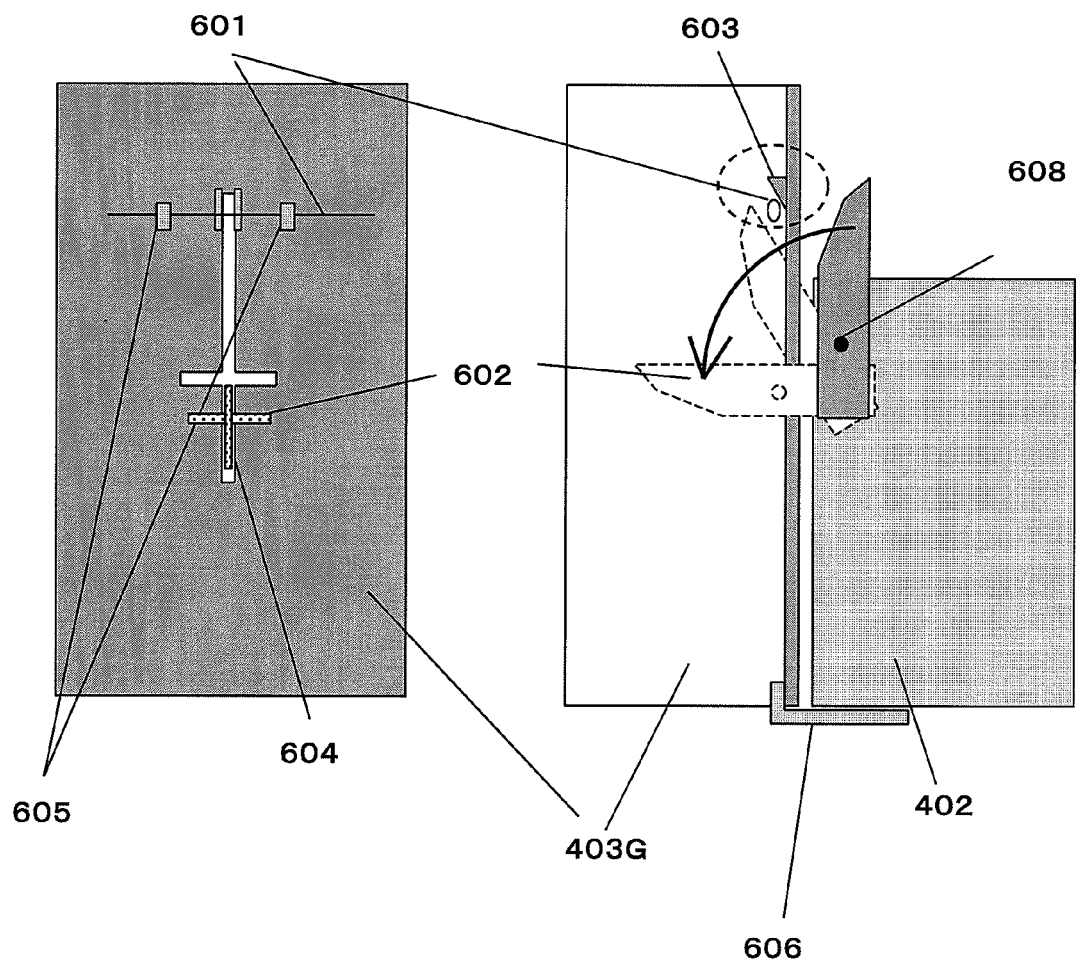
FIG. 8A is a diagram showing a structure of a fiber cutting mechanism according to the second embodiment of the present invention.
Figure 8B:
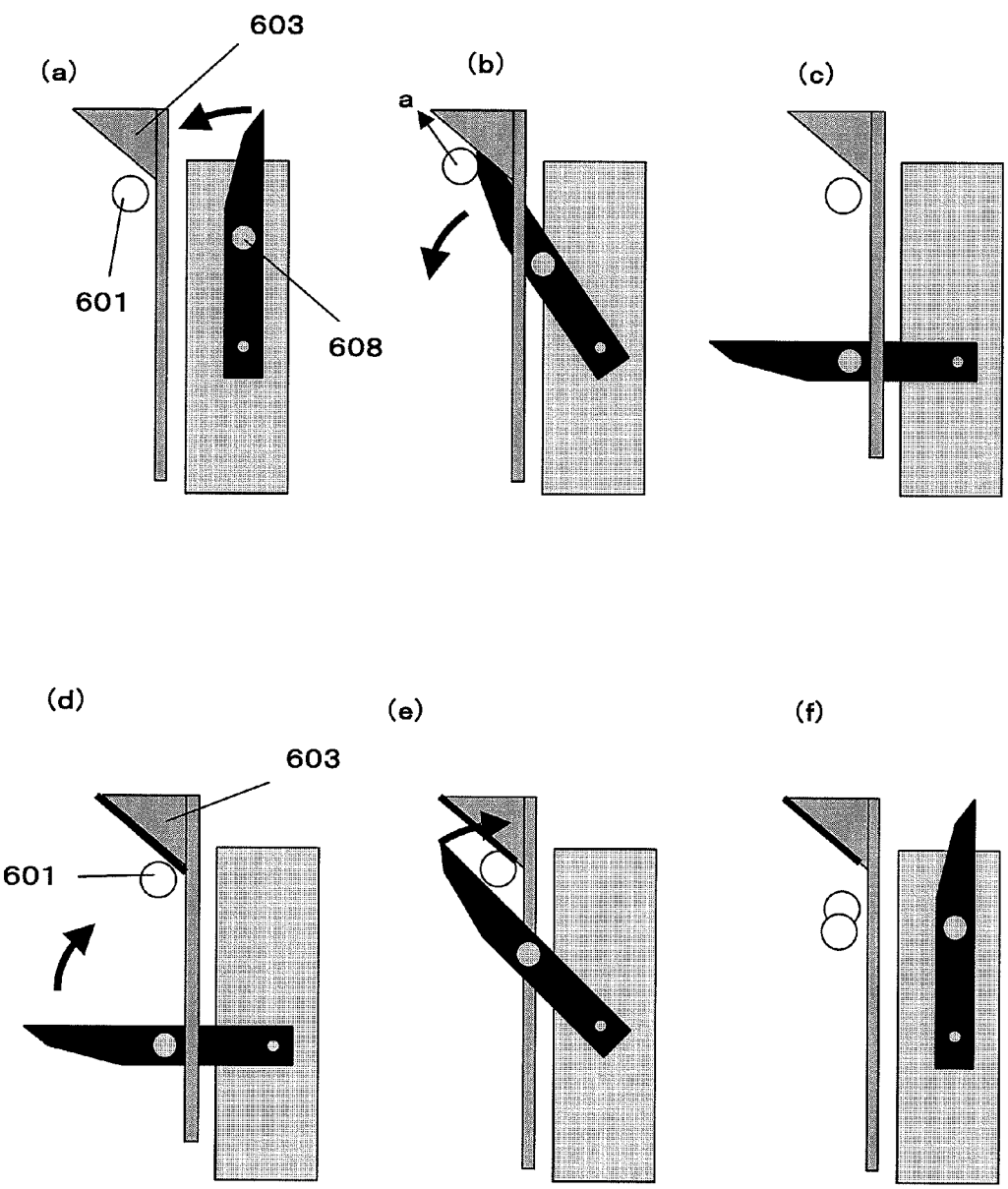
FIGS. 8B(a)-8B(f) are diagrams showing the structure of the fiber cutting mechanism according to the second embodiment of the present invention.

FIG. 8A and FIGS. 8B(a)-8B(f) are diagrams showing a structure of a fiber cutting mechanism according to the second embodiment of the present invention. The fiber cutting mechanism according to the second embodiment comprises: a guide blade 603, a slit 604, and fiber holders 605, which are provided on the green laser light source 403G side; and a fixture 602 provided on the optical engine 402 side.

The green laser light source 403G is fixed onto the optical engine 402 with the fixture 602 by the following procedure. The fixture 602 in an initial state position (FIG. 8B(a)) is tipped around the rotational axis to the green laser light source 403G side while passing through the slit 604 (FIG. 8B(b)). At this moment, the fixture 602 pushes the fiber 601 disposed at the slit 604, but the fixture 602 passes through without cutting the fiber 601 because the fiber 601 moves away. When the fixture 602 is rotated to the end, the lock pin 608 is inserted on the green laser light source 403G side (FIG. 8B(c)). The green laser light source 403G and the optical engine 402 are fixed in such a way.

At the green laser light source 403G, a fiber 601 is fixed onto the fiber holders 605 such that the above described cutting position area is disposed at the slit 604. This slit 604 is formed in a shape that can have the fixture 602 inserted therein. In between the fiber holders 605, the guide blade 603 is provided in a position that contacts the fiber 601. The fixture 602 is capable of rotating around a rotational axis provided on the optical engine 402, and has a lock pin 608.

When the green laser light source 403G is separated from the optical engine 402, the fixture 602 rotates in an upward direction because the lock pin 608 is removed (FIG. 8B(d)). The fixture 602 that has rotated in the upward direction makes contact with the fiber 601 disposed at the slit 604 (FIG. 8B(e)). At this moment, the fiber 601 is pushed by the fixture 602, squeezed in between the guide blade 603 and the fixture 602, and cut (FIG. 8B(f)).

The Third Embodiment

Figure 9A:
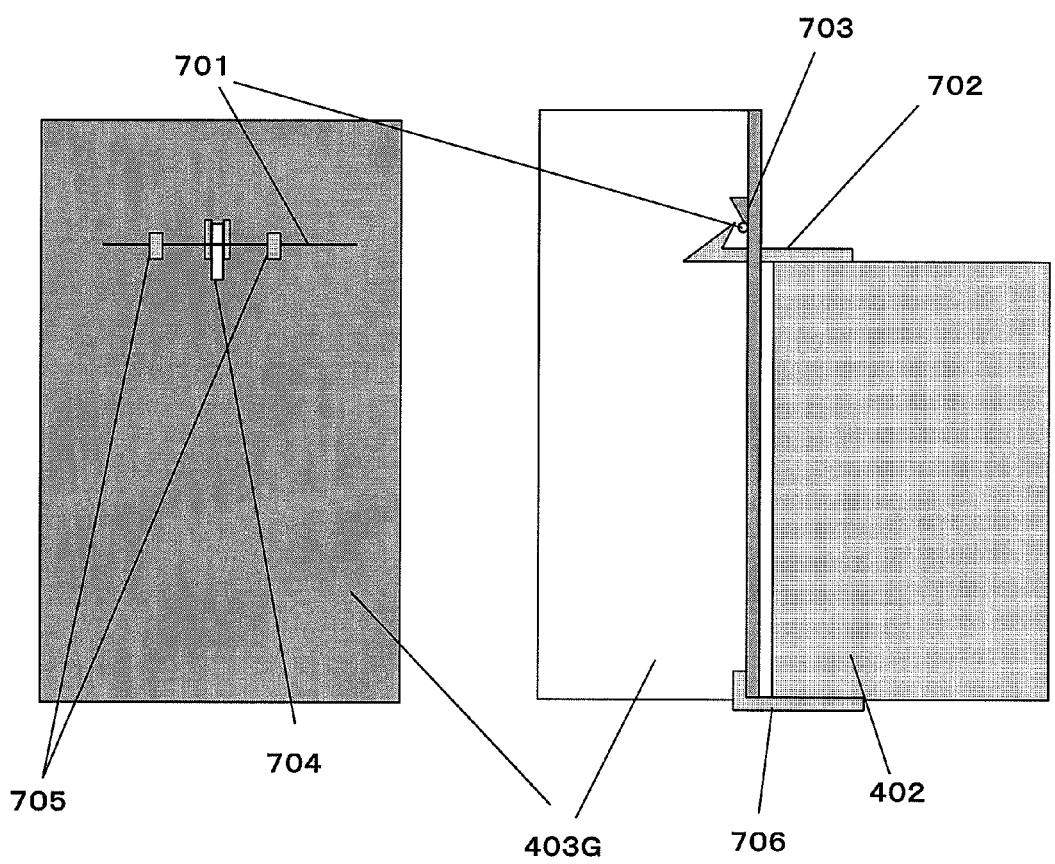
FIG. 9A is a diagram showing a structure of a fiber cutting mechanism according to the third embodiment of the present invention.
Figure 9B:
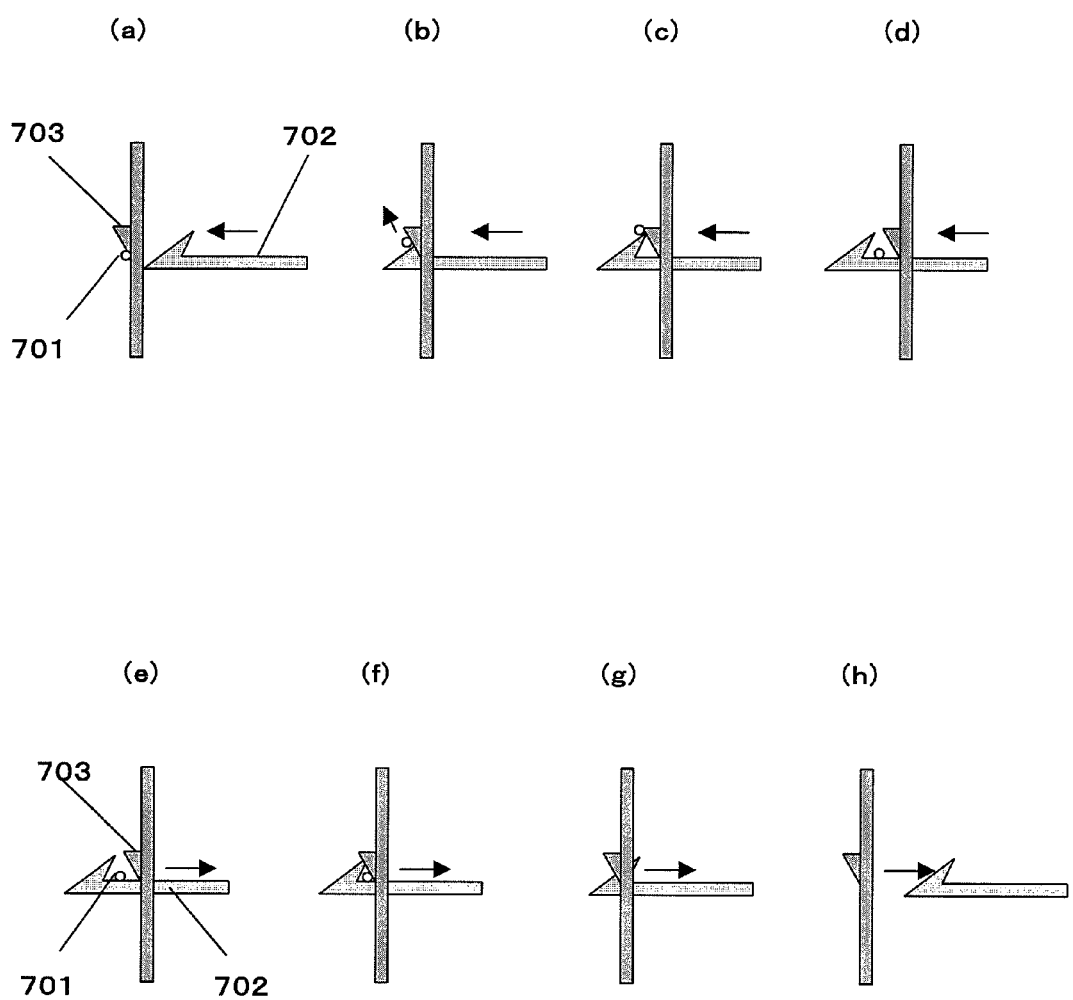
FIGS. 9B(a)-9B(h) are diagrams showing the structure of the fiber cutting mechanism according to the third embodiment of the present invention.

FIG. 9A and FIGS. 9B(a)-9B(h) are diagrams showing a structure of a fiber cutting mechanism according to the third embodiment of the present invention. The fiber cutting mechanism according to the third embodiment comprises: a guide blade 703, a slit 704, and fiber holders 705, which are provided on the green laser light source 403G side; and a fixture 702 provided on the optical engine 402 side.

At the green laser light source 403G, a fiber 701 is fixed onto the fiber holders 705 such that the above described cutting position area is disposed at the slit 704. This slit 704 is formed in a shape that can have the fixture 702 inserted therein. In between the fiber holders 705, the guide blade 703 is provided in a position that contacts the fiber 701. The fixture 702 has a shape like an arrowhead with a barb.

The green laser light source 403G is fixed onto the optical engine 402 with the fixture 702 by the following procedure. The fixture 702 in an initial state position (FIG. 9B(a)) is inserted toward the green laser light source 403G side while passing through the slit 704 (FIG. 9B(b)). At this moment, the fixture 702 pushes the fiber 701 disposed at the slit 704, but the fixture 702 passes through without cutting the fiber 701 because the fiber 701 moves away (FIG. 9B(c)). When the fixture 702 is inserted to the end, the green laser light source 403G and the optical engine 402 are fixed (FIG. 9B(d)).

When the green laser light source 403G is separated from the optical engine 402, the fixture 702 is pulled out (FIG. 9B(e)). At this moment, the fixture 702 makes contact with the fiber 701 disposed at the slit 704 (FIG. 9B(f)). As a result, the fiber 701 is squeezed in between the fixture 702 and the guide blade 703, and cut (FIGS. 9B(g) and 9B(h)).

The Fourth Embodiment

Figure 10A:
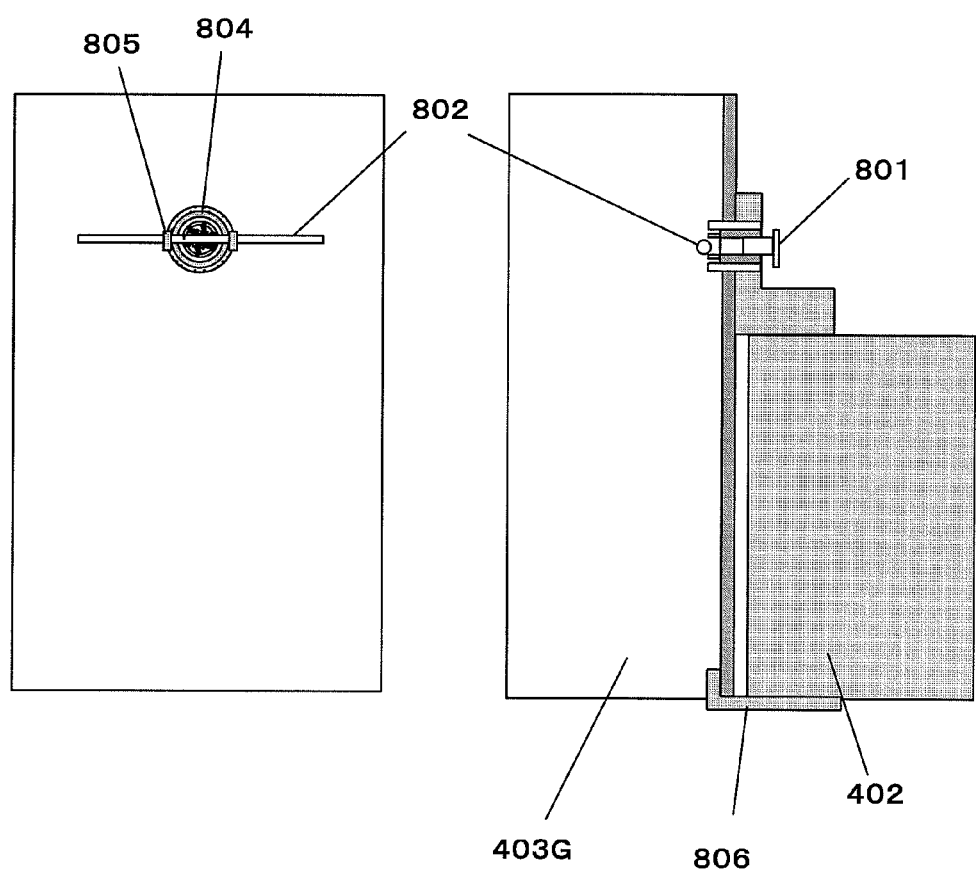
FIG. 10A is a diagram showing a structure of a fiber cutting mechanism according to the fourth embodiment of the present invention.
Figure 10B:
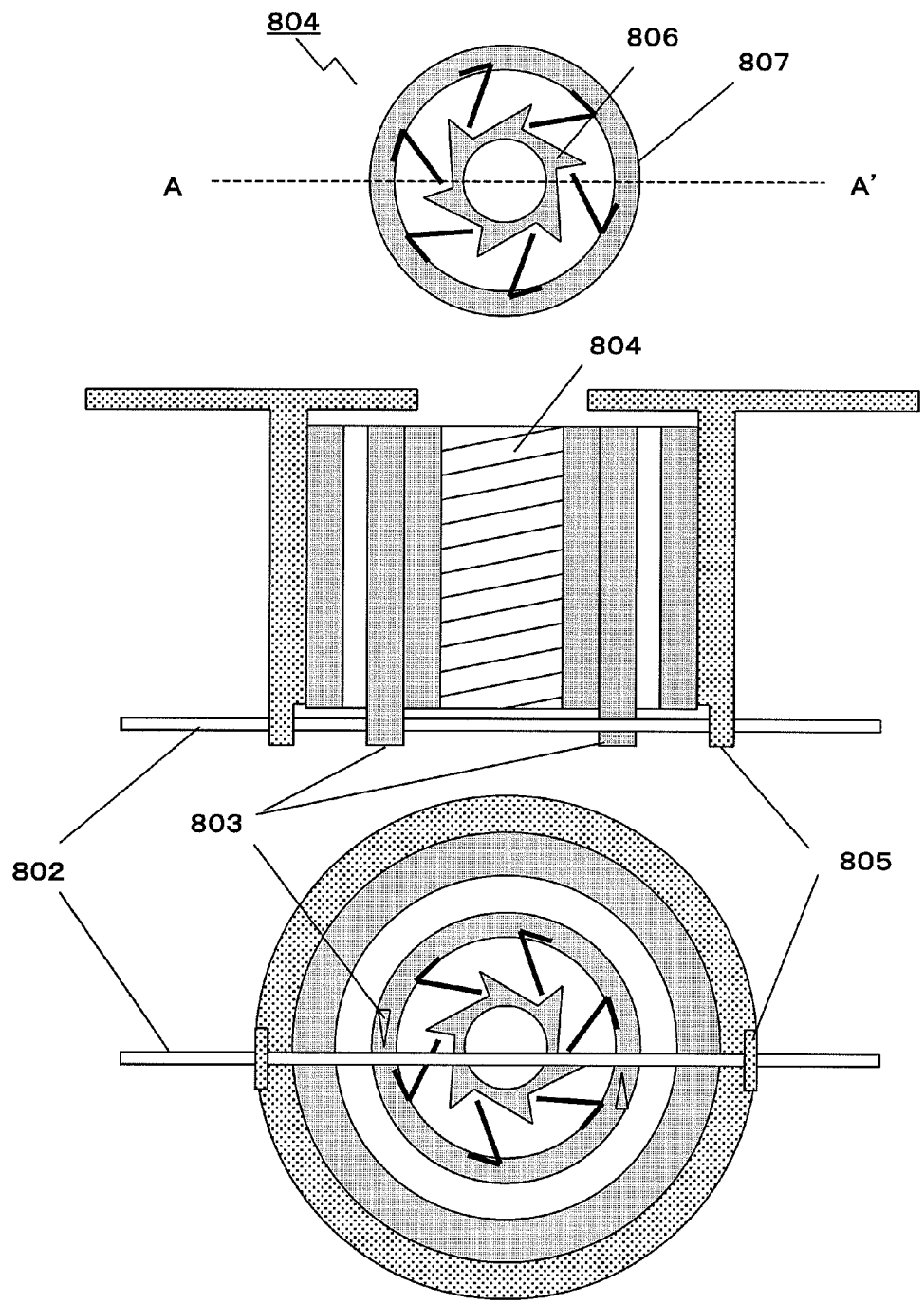
FIG. 10B is a diagram showing the structure of the fiber cutting mechanism according to the fourth embodiment of the present invention.
Figure 10C:
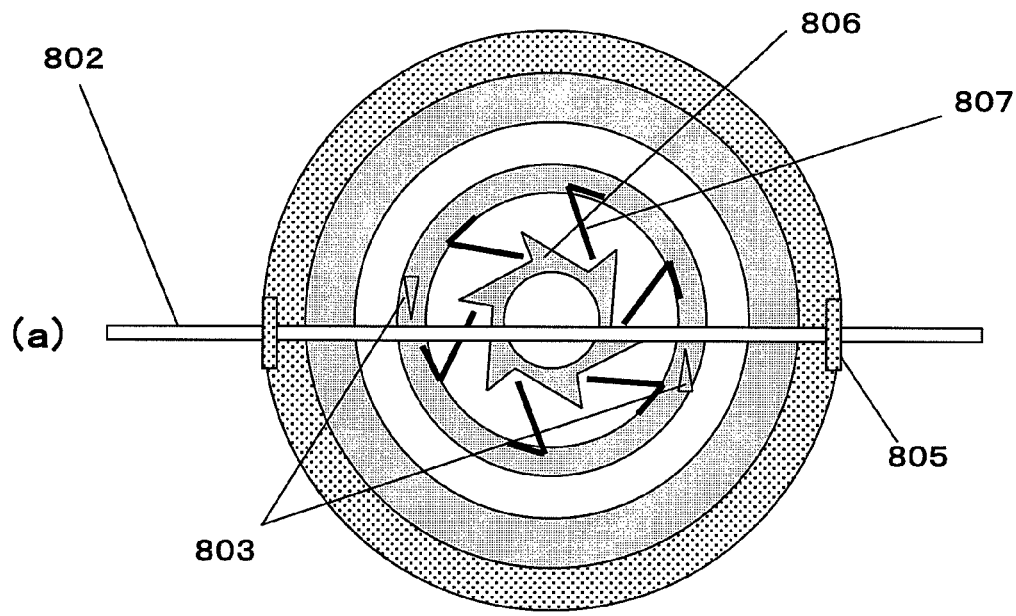
FIGS. 10C(a) and 10C(b) are diagrams showing the structure of the fiber cutting mechanism according to the fourth embodiment of the present invention.
Figure 10C:
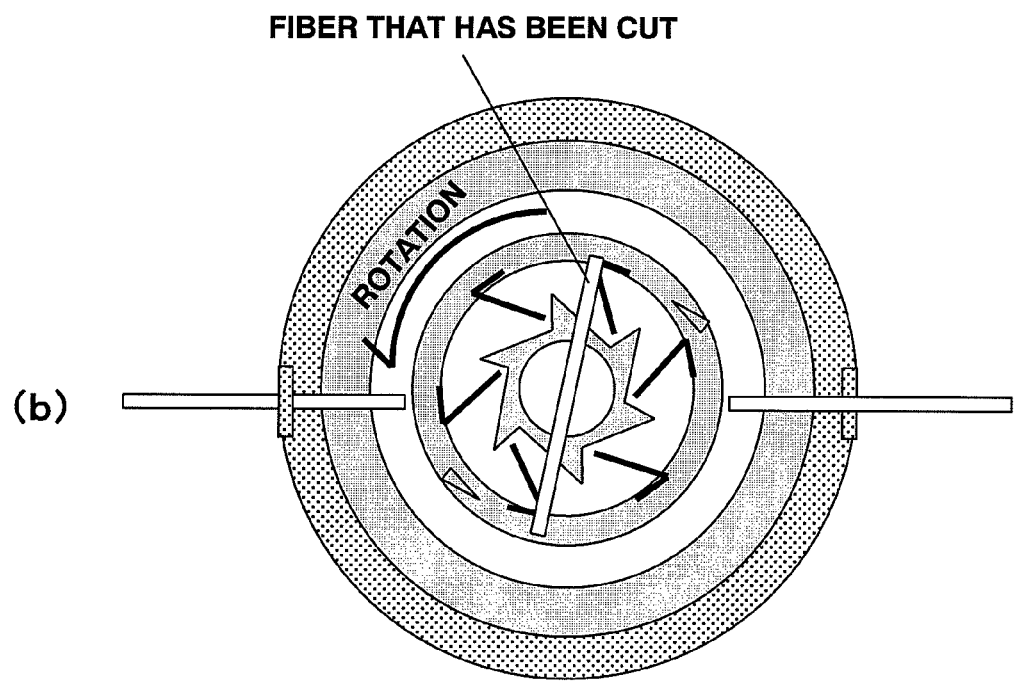

FIG. 10A to FIG. 10C(b) are diagrams showing a structure of a fiber cutting mechanism according to the fourth embodiment of the present invention. The fiber cutting mechanism according to the fourth embodiment comprises: a guide blade 803, a screw receiving section 804, and a fiber holder 805, which are provided on the green laser light source 403G side; and a screw 801 provided on the optical engine 402 side. The screw receiving section 804 has a function as a screw hole and a ratchet function that rotates the guide blade 803 in one direction.

The green laser light source 403G is fixed onto the optical engine 402 by the screw 801 with the following procedure. The screw 801 is screwed into the screw receiving section 804. At this moment, the screw 801 is screwed into the screw receiving section 804 without rotating the guide blade 803 because of the ratchet function by a gear 806 and a leaf spring 807. The green laser light source 403G and the optical engine 402 are fixed in this way (FIG. 10C(a)).

When the green laser light source 403G is separated from the optical engine 402, the screw 801 is rotated in such a direction as to be removed. At this moment, the screw receiving section 804 rotates the guide blade 803 by the ratchet function. Consequently, a fiber 802 is cut by the guide blade 803 (FIG. 10C(b)).

As described above, with the fiber cutting mechanisms according to the first to fourth embodiments, the green laser light source 403G can be rendered inoperable when the green laser light source 403G is mechanically or electrically separated from the optical engine 402.

The fiber cutting mechanisms described in the embodiments are merely examples, and other mechanisms may be used as long as they can cut the fiber. For example, there may be a plurality of fibers to be cut, or there may be a plurality of fixtures, guide blades, or the likes.

Additionally, the fiber cutting mechanism of the present invention and the method described above as a conventional example that destroys an excitation laser light source by a voltage surge or the like, may be combined.

Furthermore, a fiber laser doped with a rare-earth element such as Yb, Nd, Er, Dy, Pr, Tb, Eu, Ce, Tm, Ho, Gd, Y or La may be used. Moreover, the degree of doping with the rare-earth element may be changed in accordance with the wavelength or the output of the wavelength converter, and a plurality of the rare-earth elements may be used for doping. In particular, when using Nd or Yb, a phenomenon, in which oscillation efficiency is reduced because of self-generated heat due to absorption of the generate light, is significant. Therefore, it is desired to minimize the structure of the present invention. Moreover, MgO:LiNbO$_3$, potassium titanyl phosphate (KTP), Mg:LiTaO$_3$ or the like, which has a periodic domain-inverted structure, is used in the wavelength conversion element.

<Other System Environment Examples in which the Present Invention is Applied>

Figure 11:
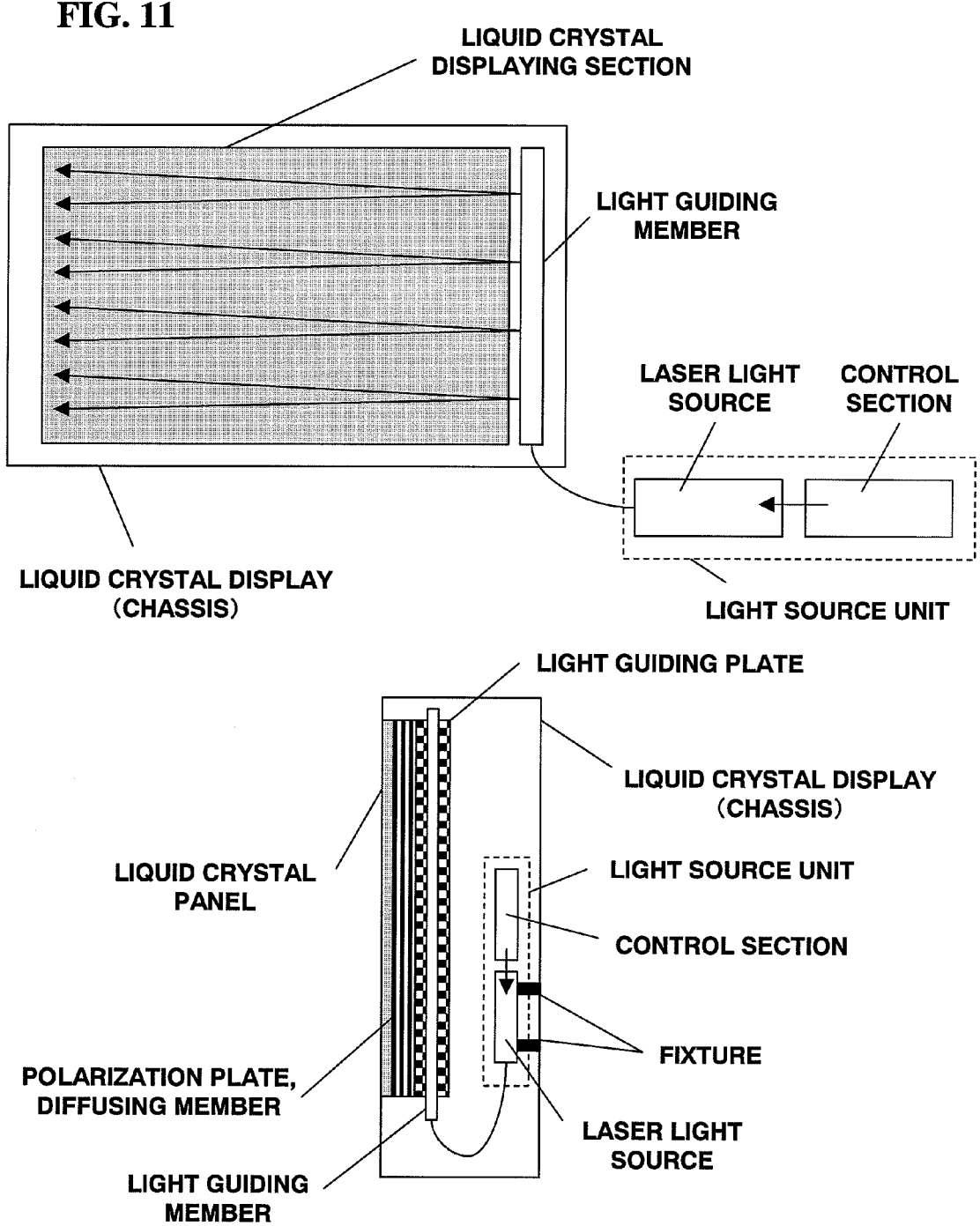
FIG. 11 is a diagram showing another system environment example in which the present invention is applied.
Figure 12:
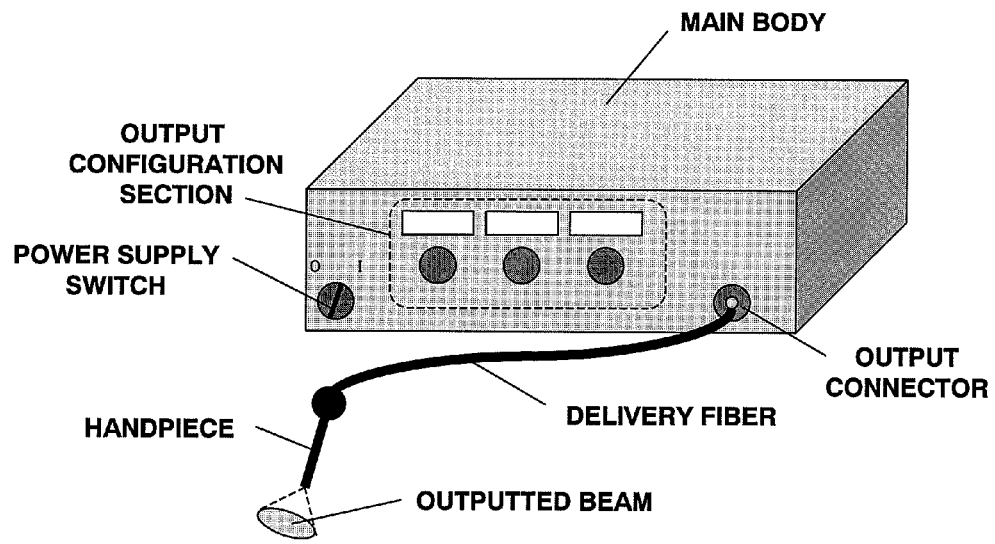
FIG. 12 is a diagram showing another system environment example in which the present invention is applied.
Figure 12:
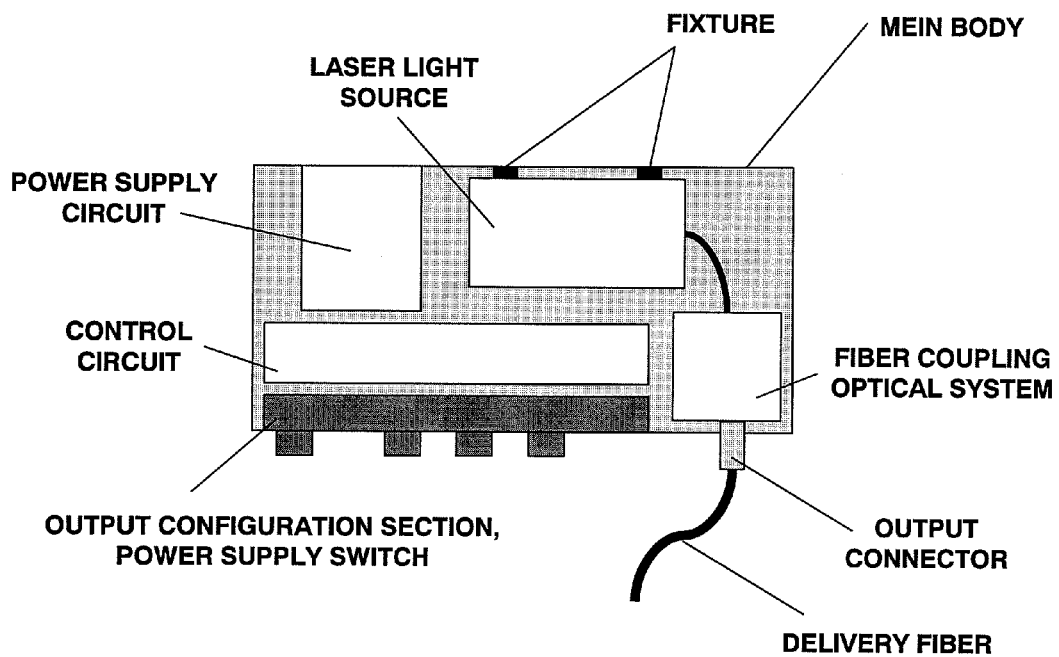

The fiber cutting mechanism of the present invention may be used, not only in the above described laser light source of the rear projection display 400, but also in a laser light source of a front projection display, in a backlight light source that illuminates a liquid crystal panel (FIG. 11), or in a laser light source of a medical apparatus used in a surgery or the like (FIG. 12).

INDUSTRIAL APPLICABILITY

The fiber cutting mechanism of the present invention is applicable in fields such as the display device field and the medical device field; in particular, useful in cases, for example, when prevention of secondary utilization of a fiber laser is desired.

The invention claimed is:

1. A fiber cutting mechanism provided on a laser device mounted on a laser light source application apparatus,
    the laser device comprising:
        an excitation laser light source that inputs a laser light into a fiber,
        a fiber laser light source that includes a fiber containing a laser activating substance and a fiber laser resonator containing a fiber with a fiber grating formed therein, and
        a wavelength conversion element that coverts a laser light with a fundamental wave emitted from the fiber laser light source into a harmonic laser light, and
    the fiber cutting mechanism comprising
        a fiber cutting section that performs fiber cutting in a specified area from a point within the fiber grating to a connection point between the fiber grating and the fiber containing the laser activating substance, when the laser device is separated from the laser light source application apparatus.

2. The fiber cutting mechanism according to claim 1, wherein
    the fiber cutting section comprises:
        a box in which a chemical agent, which generates a substantial amount of gas when heated, is enclosed;
        a heater that heats the chemical agent;
        a detection section that detects a separation of the laser device from the laser light source application apparatus; and
        a power supply that applies current to the heater in response to the separation detected by the detection section; and
    the box bursts due to heating of the chemical agent, thereby performing the fiber cutting in the specified area.

3. The fiber cutting mechanism according to claim 2, wherein
    the detection section detects at least one of either a mechanically separated state or an electrically separated state of the laser device and the laser light source application apparatus.

4. The fiber cutting mechanism according to claim 1, wherein the specified area is formed of a double-clad fiber.

5. The fiber cutting mechanism according to claim 1, wherein
    the fiber containing the laser activating substance is a Yb-doped double clad fiber, and
    a wavelength of the fundamental wave is from 1000 nm to 1200 nm.

6. The fiber cutting mechanism according to claim 1, wherein an outer diameter of the fiber is from 240 μm to 260 μm.

7. The fiber cutting mechanism according to claim 1, wherein the connection point between the fiber grating and the fiber containing the laser activating substance is on a fiber where a seed light, which is the fundamental wave, resonates.

8. The fiber cutting mechanism according to claim 1, wherein
    the fiber cutting section includes:
        a slit provided in the specified area of the fiber, and
        a guide blade that performs the fiber cutting in cooperation with a fixture provided on the laser light source application apparatus,
    the laser device is mounted on the laser light source application apparatus by means of the fixture, and the fiber cutting is performed in the specified area by passing of the fixture through the slit when the laser device is mechanically separated from the laser light source application apparatus.

9. The fiber cutting mechanism according to claim 8, wherein the specified area is formed of a double-clad fiber.

10. The fiber cutting mechanism according to claim 8, wherein the fiber containing the laser activating substance is a Yb-doped double clad fiber, and a wavelength of the fundamental wave is from 1000 nm to 1200 nm.

11. The fiber cutting mechanism according to claim 8, wherein an outer diameter of the fiber is from 240 µm to 260 µm.

12. The fiber cutting mechanism according to claim 8, wherein the connection point between the fiber grating and the fiber containing the laser activating substance is on a fiber where a seed light, which is the fundamental wave, resonates.

13. The fiber cutting mechanism according to claim 1, wherein the fiber cutting section includes:

a guide blade provided in the specified area of the fiber, which rotates to perform the fiber cutting, and a screw receiving section that rotates the guide blade in one direction by a ratchet function, in cooperation with a screw attached from a laser light source application apparatus side, the laser device is mounted on the laser light source application apparatus by means of the screw, and the fiber cutting is performed in the specified area with a rotation of the guide blade by the screw receiving section when the screw is unscrewed and the laser device is mechanically separated from the laser light source application apparatus.

14. The fiber cutting mechanism according to claim 13, wherein the specified area is formed of a double-clad fiber.

15. The fiber cutting mechanism according to claim 13, wherein the fiber containing the laser activating substance is a Yb-doped double clad fiber, and a wavelength of the fundamental wave is from 1000 nm to 1200 nm.

16. The fiber cutting mechanism according to claim 13, wherein an outer diameter of the fiber is from 240 µm to 260 µm.

17. The fiber cutting mechanism according to claim 13, wherein the connection point between the fiber grating and the fiber containing the laser activating substance is on a fiber where a seed light, which is the fundamental wave, resonates.

18. A laser light source application apparatus comprising:

a laser light source that outputs a laser light, an optical engine that produces, in response to an input video signal, an optical signal from the laser light outputted from the laser light source, a screen that projects the optical signal produced by the optical engine, and the fiber cutting mechanism according to claim 1 that is provided in the laser light source.

19. A laser light source application apparatus comprising:

a laser light source that outputs a laser light, a backlight formed with the laser light outputted by the laser light source, a liquid crystal panel illuminated by the backlight, and the fiber cutting mechanism according to claim 1 that is provided in the laser light source.

20. A laser light source application apparatus comprising:

a laser light source that outputs a laser light, a fiber coupling optical system that produces, in response to a control signal, an optical signal from the laser light outputted from the laser light source, a delivery fiber that outputs the optical signal produced by the fiber coupling optical system, and the fiber cutting mechanism according to claim 1 that is provided in the laser light source.

* * * * *